United States Patent [19]

Shepherd

[11] 4,201,883
[45] May 6, 1980

[54] GUARD FOR A HIGH VOLTAGE ELECTRICAL TERMINAL BUSHING

[76] Inventor: William E. Shepherd, 309 Drake Ave., New Carlisle, Ohio 45344

[21] Appl. No.: 848,265

[22] Filed: Nov. 3, 1977

[51] Int. Cl.² .................... H01B 17/00; H01B 17/46
[52] U.S. Cl. .............................. 174/139; 174/140 R; 361/40; 361/132; 361/137
[58] Field of Search .................. 174/5 R, 138 F, 139, 174/140 R, 140 H, 145; 313/325; 361/35, 38, 39, 40, 131, 132, 137

[56] References Cited

U.S. PATENT DOCUMENTS

| 2,065,315 | 12/1936 | Keath | 174/5 R X |
| 2,092,515 | 9/1937 | Jervey | 174/146 |
| 2,263,319 | 11/1941 | Treanor | 361/132 X |
| 2,414,732 | 1/1947 | Fox | 361/132 X |
| 2,840,631 | 6/1958 | Marcroft | 174/139 X |
| 2,875,267 | 2/1959 | Sutton, Jr. | 174/139 |

FOREIGN PATENT DOCUMENTS 425561  4/1911  France ........................... 174/139

Primary Examiner—Laramie E. Askin
Attorney, Agent, or Firm—Biebel, French & Nauman

[57] ABSTRACT

A guard for a high voltage terminal bushing includes a generally circular planar isolating member of an electrically insulating material which is mounted on the upper surface of the bushing and provided with a plurality of openings through which wind and rain may freely pass. A radial diameter of the isolating member is sufficient to prevent small animals from contacting a high voltage cable connected to the bushing and ground potential. A cylindrical section extends downwardly from the isolating member to support the guard on the upper surface of the bushing. A second cylindrical member extends downwardly and surrounds the upper portion of the bushing to form a cap to protect and shield the terminal end of the bushing. A lightning arrestor may be included which extends from adjacent the high voltage terminal to a point adjacent a transformer housing or ground potential.

10 Claims, 3 Drawing Figures

U.S. Patent    May, 6, 1980    4,201,883

GUARD FOR A HIGH VOLTAGE ELECTRICAL TERMINAL BUSHING

BACKGROUND OF THE INVENTION

This invention relates to a guard for bushing terminals for high voltage cables. The guard may be installed not only on transformer bushings but on high-line or transmission bushings and also riser bushings. The guard is installed on the upper surface of the bushing and surrounds the high voltage cable to prevent small animals from contacting both the high voltage line and the transformer housing or ground potential.

In one form of a bushing terminal guard, shown in U.S. Pat. No. 2,263,319, a cup-shaped member of insulating material is placed over the high voltage terminal and includes openings in its side walls to accommodate the high voltage cable. The guard is mounted on the bushing by means of inwardly extending radial fins. This device only covers the end of the bushing and does not prevent a small animal standing on the transformer housing from contacting the high voltage lead.

Another prior art device, shown in U.S. Pat. No. 2,414,732, is in the form of a sheet which is placed over an exposed high voltage member to prevent birds from perching thereon and pecking at adjacent grounded portions, thus causing short circuits. This device, however, is only suitable to prevent birds from resting on an energized portion of the transformer, and it would not prevent small animals, such as squirrels, from creating a short circuit path between a high voltage cable and ground.

SUMMARY OF THE INVENTION

In the present invention, a guard for bushing terminals for high voltage cables includes an isolating member of an electrically insulative material which is mounted on the upper surface of the bushing and is provided with an opening through which a high voltage cable may freely pass. The isolating member is preferably planar and circular and is provided with a plurality of openings or holes through which wind and rain may freely pass. This open construction prevents birds from building nests in the protected area under the planar member. The radial dimension of the isolating member is large enough to prevent small animals, such as squirrels or birds, from simultaneously contacting the high voltage cable and ground potential.

In a preferred embodiment, a short cylindrical section extends downwardly from the isolating member and rests upon the upper surface of the bushing. A second cylindrical member coaxial with the first cylindrical member, extends downwardly from the isolating member and surrounds the upper portion of the bushing thereby to form a cap which completely protects and shields that portion of the bushing which has exposed metal thereon. The isolating member and both cylindrical members may be formed integrally of an insulating plastic material.

When the invention briefly described above is used on a transformer, for example, a small animal standing on the transformer housing cannot, because of the isolating member, reach upwardly from the transformer and across the isolating member to contact the high voltage cable. On the other hand, an animal sitting on the upper surface of the isolating member cannot simultaneously contact the high voltage cable and the transformer housing.

The guard may also be provided with a lightning arrestor comprising an electrically conductive wire extending radially on the upper surface of the isolating member, with one end of the wire positioned in close proximity to but not in contact with the high voltage cable or a connector attached thereto. The other end of the wire extends downwardly into close proximity to but spaced from the transformer housing or ground potential.

It is therefore an object of this invention to provide a guard for bushing terminals for high voltage cables including an isolating member of electrically insulating material having means forming an opening in the center thereof coaxially aligned with the bushing, said isolating member having a minimum radial dimension large enough to prevent small animals from simultaneously contacting the high voltage cable and ground potential, means forming a plurality of openings through said isolating member for permitting wind and rain to pass freely therethrough, and means for securing said guard onto the bushing.

Other objects and advantages of the invention will be apparent from the following description, the accompanying drawings and the appended claims.

DESCRIPTION OF THE PREFERRED EMBODIMENT

Figure 1:
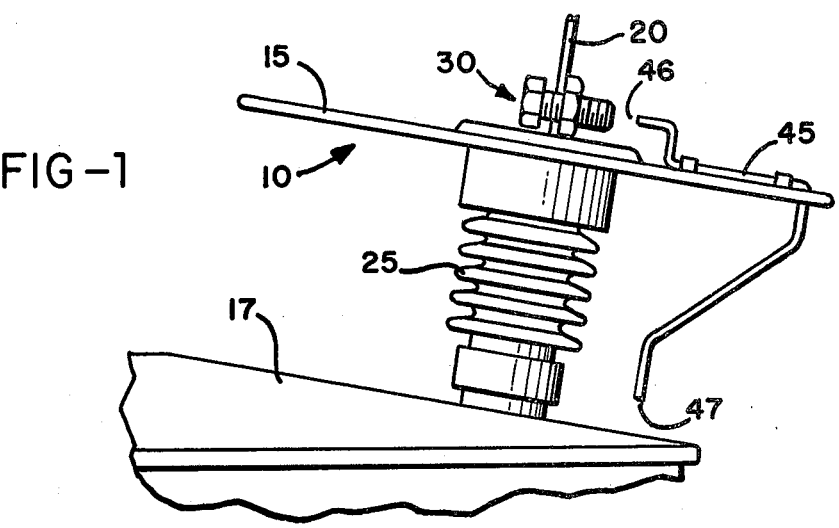
FIG. 1 is an elevational view showing a guard constructed according to this invention installed on a transformer bushing terminal.
Figure 2:
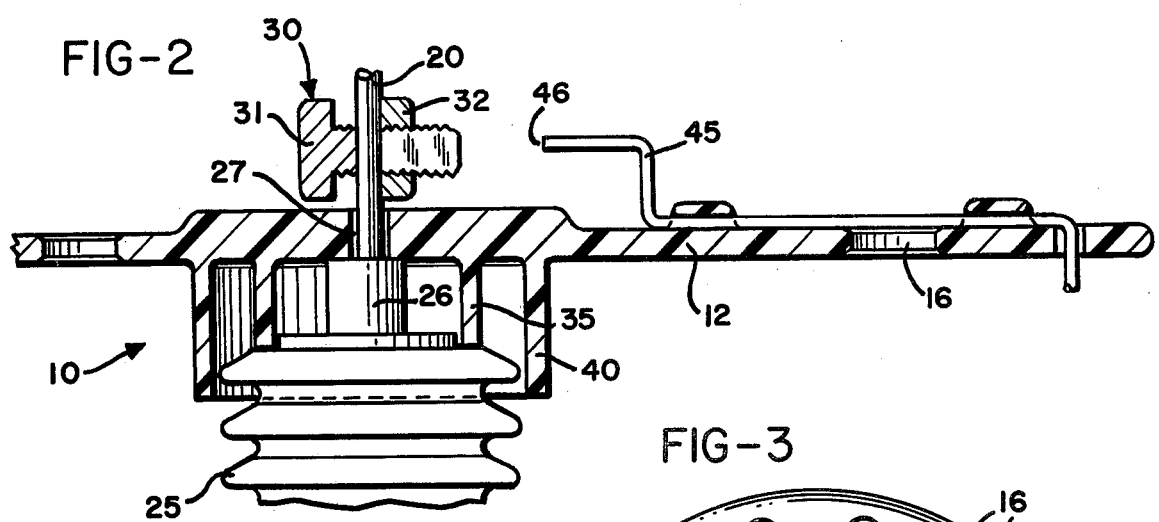
FIG. 2 is a cross-sectional view of a bushing guard constructed according to this invention.
Figure 3:
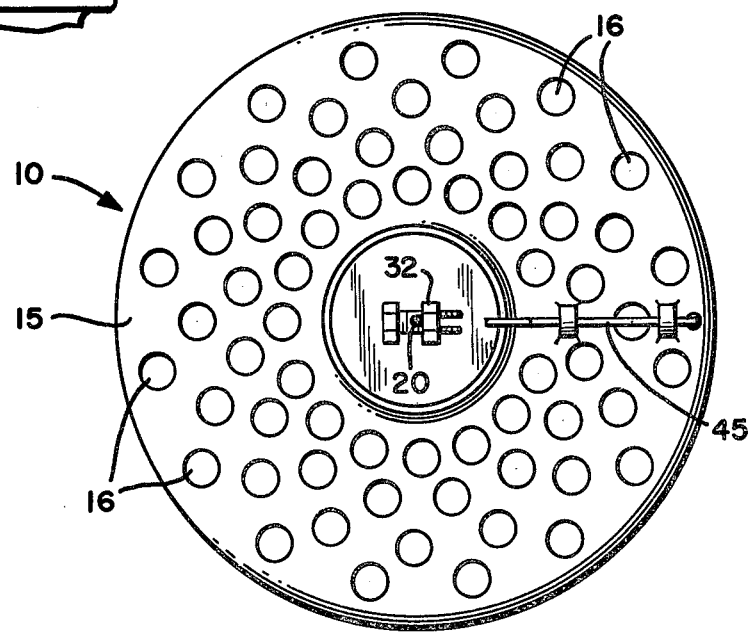
FIG. 3 is a plan view of the bushing guard of FIGS. 1 and 2.

In the preferred form of the invention, as shown in FIGS. 1–3, a guard 10 includes a generally planar isolating member 15 having a plurality of small openings 16 formed therein, the purpose of which will be discussed later, the isolating member being preferably circular in shape and of a diameter sufficient to prevent a small animal from contacting both a transformer housing 17 and a high voltage line 20.

As shown in FIG. 1, a transformer housing 17 is shown with a bushing terminal 25 extending upwardly therefrom. This bushing 25 is of sufficient length to prevent arcing between a high voltage line 20 which is connected to and through the insulator to the transformer contained within the housing. The upper surface of the bushing 25 normally includes an exposed terminal assembly 26. The high voltage line is connected to the terminal by conventional means which form no part of the present invention.

The guard 10 is provided with means defining an opening 27 through which the high voltage line 20 extends into the transformer bushing. A clamp 30 is secured to the line 20 to prevent the guard 10 from moving upwardly and away from the busing 25. The clamp 30 could take the form of a split bolt 31 secured to the wire by nut 32.

As shown in FIG. 2, a cylindrical inner member 35 rests on the upper surface of the bushing 25 and surrounds the terminal assembly 26. A second, longer cylindrical member 40 extends downwardly from the isolating member 15 a distance sufficient to prevent any animal from reaching inside and possibly contacting the high voltage terminal assembly 26. The diameter of this second cylindrical member is such that it provides a close clearance with the insulator or bushing.

The isolating member 15 is preferably circular, although it should be understood that any shape can be used as long as the minimum radial dimension is sufficient to prevent short circuiting of the high voltage cable 20 by small animals.

A plurality of openings 16 are formed in the member 15, as best seen in FIG. 3, to allow rain, snow and other forms of precipitation to pass through the upper member, thereby preventing accumulation of precipitation on the upper surface thereof, and more importantly to prevent birds and other small animals from building nests in the otherwise protected area beneath the member 15.

A lightning protector is also provided in the preferred form of this invention, and includes a wire 45 having its upper end 46 spaced from the high voltage line 20 or the clamp 30, the wire extending radially outwardly, as shown in FIG. 3, where it then descends with its lower end 47 in close proximity to but not in contact with the transformer case 17. The spacing of the lightning arrestor wire 45 from the wire 20 and case 17 depend upon the voltage carried by the high voltage line, and is close enough to allow any high voltage surges caused by lightning strikes to be carried thereby to prevent damage to the transformer and to the bushing.

With the present invention, an animal sitting on the upper surface of the isolating member 15 can contact both the lightning arrestor and the high voltage line without coming in contact with ground potential. Similarly, an animal standing on the transformer case 17 could contact the lightning arrestor wire 45, and not be injured because the upper part of the lightning arrestor is not connected to the high voltage line.

It will be apparent to those skilled in the art that other forms of this invention can be used with all types of systems including primary, high-line, substation, and underground risers.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A guard for an electrical bushing of the type which is mounted so as to extend outwardly from a member at ground potential and which has a terminal at its upper end for connecting a high voltage cable, said guard being adapted for installation on the upper surface of the bushing and being of a size and shape sufficient to prevent small animals from simultaneously contacting the high voltage cable and the grounded member when installed on the upper surface of the bushing, said guard comprising:

an isolating member of electrically insulating material having means forming an opening in the center thereof for coaxial alignment with the bushing,
said isolating member having a generally planar portion having upper and lower surfaces and having a minimum radial dimension large enough to prevent small animals from simultaneously contacting the high voltage cable and the member at ground potential when the isolating member is installed on the upper surface of the bushing,
means for securng said isolating member onto the bushing, and
means extending from the lower surface of said planar portion having a diameter sufficient to surround the bushing for providing shielding for the high voltage cable and its connection to said bushing from beneath said isolating member when the isolating member is installed on the upper surface of the bushing,
said generally planar portion of said isolating member being substantially larger in diameter than the diameter of said means extending from the lower surface thereof.

2. The guard of claim 1 further including
means forming a plurality of openings through said isolating member for permitting wind and rain to pass freely therethrough.

3. A guard for an electrical bushing of the type which is mounted so as to extend outwardly from a member at ground potential and which has a terminal at its upper end for connecting a high voltage cable, said guard being adapted for installation on the upper surface of the bushing and being of a size and shape sufficient to prevent small animals from simultaneously contacting the high voltage cable and the grounded member when installed on the upper surface of the bushing, said guard comprising:

an isolating member of electrically insulating material having means formng an opening in the center thereof for coaxial alignment with the bushing,
said isolatng member having a generally planar portion having upper and lower surfaces and having a minimum radial dimension large enough to prevent small animals from simultaneously contacting the high voltage cable and the member at ground potential when the isolating member is installed on the upper surface of the bushing,
means for securing said isolating member onto the bushing, and
a first cylindrical member integrally formed with said isolating member and extending from the lower surface of said planar portion for engaging the upper surface of the bushing to space said planar portion axially therefrom when the isolating member is installed on the upper surface of the bushing,
said generally planar portion of said isolating member being substantially larger in diameter than the diameter of said first cylindrical member.

4. A guard as defined in claim 3 further including a second cylindrical member coaxially aligned with said first cylindrical member and having a diameter sufficient to surround and to extend downwardly to a point below the upper surface of the bushing when the isolating member is installed on the upper surface of the bushing.

5. The guard of claim 3 further including means forming a plurality of openings through said isolating member for permitting wind and rain to pass freely therethrough.

6. A guard for an electrical bushing of the type which is mounted so as to extend outwardly from a member at ground potential and which has a terminal at its upper end for connecting a high voltage cable, said guard being adapted for installation on the upper surface of the bushing and being of a size and shape sufficient to prevent small animals from simultaneously contacting the high voltage cable and the grounded member when installed on the upper surface of the bushing, said guard comprising:

an isolating member of electrically insulating material having means forming an opening in the center thereof for coaxial alignment with the bushing, said isolating member having a generally planar portion having upper and lower surfaces and having a minimum radial dimension large enough to prevent small animals from simultaneously contacting the high voltage cable and the member at ground potential when the isolating member is installed on the upper surface of the bushing, means for securing said isolating member onto the bushing, and lightning arrestor means including an electrically conductive wire attached to said isolating member having one end positioned in spaced relationship to the upper surface of said planar portion for placement in close proximity to but spaced from said high voltage cable, and the other end positioned below the lower surface of said planar portion for placement in close proximity to but spaced from the member at ground potential.

7. The guard of claim 6 further including means forming a plurality of openings through said isolating member for permitting wind and rain to pass freely therethrough.

8. A guard for an electrical bushing of the type which is mounted so as to extend outwardly from a member at ground potential and which has a terminal at its upper end for connecting a high voltage cable, said guard being adapted for installation on the upper surface of the bushing and being of a size and shape sufficient to prevent small animals from simultaneously contacting the high voltage cable and the grounded member when installed on the upper surface of the bushing, said guard comprising:

a generally planar member of electrically insulating material having means forming an opening in the center thereof through which, when said planar member is installed on the upper surface of the bushing, a high voltage cable may freely pass into the bushing, said planar member having upper and lower surfaces and a minimum radial dimension large enough to prevent small animals from simultaneously contacting the high voltage cable and the member at ground potential when said planar member is installed on the upper surface of the bushing, means forming a plurality of openings through said planar member for permitting wind and rain to pass freely therethrough, a first cylindrical member coaxially aligned with said central opening and extending from said lower surface of said planar member for engaging the upper surface of the bushing to space said planar member vertically therefrom when said planar member is installed on the surface of the bushing, a second cylindrical member coaxially aligned with said first cylindrical member and having a diameter sufficient to surround the bushing and a length sufficient to extend downwardly to a point below the upper surface of the bushing when said planar member is installed on the upper surface of the bushing, lightning arrestor means including an electrically conductive wire attached to said planar member and having one end positioned in spaced relationship to the upper surface of said planar member for placement in close proximity to but spaced from the high voltage cable and the other end positioned below the lower surface of said planar member for placement in close proximity to but spaced from the member at ground potential, and means for securing said planar member onto the bushing.

9. The guard as defined in claim 8 wherein said planar member and said first and second cylindrical members are integrally formed from an electrically insulative material.

10. A guard for an electrical bushing of the type which is mounted so as to extend outwardly of a high voltage grounded transformer housing and which has a terminal at its upper end for connecting a high voltage cable, said guard being adapted for installation on the upper surface of the bushing and being of a size and shape sufficient to prevent small animals from simultaneously contacting the high voltage cable and the grounded transformer housing when installed on the upper surface of the bushing, said guard comprising:

a generally circular, planar member of electrically insulating material having means forming an opening in the center thereof through which, when said planar member is installed on the upper surface of the bushing, a high voltage cable may freely pass into the bushing, said planar member having upper and lower surfaces and a minimum radial dimension large enough to prevent small animals from simultaneously contacting the high voltage cable and the grounded transformer housing when said planar member is installed on the upper surface of the bushing, means forming a plurality of openings through said planar member for permitting wind and rain to pass freely therethrough, a first cylindrical member coaxially aligned with said central opening and extending from said lower surface of said planar member for engaging the upper surface of the bushing when installed thereon to space said planar member vertically therefrom, a second cylindrical member coaxially aligned with said first cylindrical member and having a diameter sufficient to surround the bushing and a length sufficient to extend downwardly to a point below the upper surface of the bushing when installed thereon, lightning arrestor means including an electrically conductive wire attached to said planar member and having one end positioned for placement in close proximity to but spaced from the high voltage cable, said wire extending radially outwardly toward the outer edge of said planar member and then downwardly for placement into close proximity to the grounded transformer housing, and means for securing said planar member onto the bushing.

* * * * *